United States Patent [19]
Maezawa et al.

[11] Patent Number: 5,344,900
[45] Date of Patent: Sep. 6, 1994

[54] PROCESS FOR PRODUCING A NORBORNENE POLYMER

[75] Inventors: Hiroshi Maezawa; Junichi Matsumoto, both of Sodegaura; Hideki Aiura, Tokyo; Satoshi Asahi, Sodegaura, all of Japan

[73] Assignee: Idemitsu Kosan Company Limited, Tokyo, Japan

[21] Appl. No.: 56,587

[22] Filed: Apr. 30, 1993

Related U.S. Application Data

[62] Division of Ser. No. 664,372, Mar. 4, 1991, abandoned.

[30] Foreign Application Priority Data

Mar. 6, 1990 [JP] Japan .................................. 2-52639
Nov. 29, 1990 [JP] Japan .................................. 2-325854

[51] Int. Cl.$^5$ .......................... C08F 4/42; C08F 4/80; C08F 132/00
[52] U.S. Cl. .................................. 526/160; 526/171; 526/283
[58] Field of Search .................... 526/283, 160, 171

[56] References Cited

U.S. PATENT DOCUMENTS

| | | | |
|---|---|---|---|
| 3,330,815 | 7/1967 | McKeon et al. | 526/171 |
| 4,080,491 | 3/1978 | Kobayashi et al. | |
| 4,138,448 | 2/1979 | Minchak | 526/283 |
| 4,908,420 | 3/1990 | Sassaki et al. | 526/76 |

FOREIGN PATENT DOCUMENTS

| | | | |
|---|---|---|---|
| 61-221206 | 10/1986 | Japan . | |
| 1268973 | 3/1972 | United Kingdom | 526/283 |
| 2127030 | 3/1978 | United Kingdom . | |

OTHER PUBLICATIONS

Database WPIL, accession No. 86-300754 [46]. Derwent Publications Ltd., London, GB; & JP 61 221 206. Derwent Abstract vol. 11, No. 60 (C-405)(2507) Feb. 24, 1987; abstract of JP 61-221206.

Gaylord et al, "Poly-2,3-and 2,7-Bicyclo[2.2.1]hept-2-enes: Preparation and structures of Polynorbornenes", J.Macromol, Sci.-Chem.,All(5), pp. 1053-1070 (1977).

*Primary Examiner*—Joseph L. Schofer
*Assistant Examiner*—Wu C. Cheng
*Attorney, Agent, or Firm*—Frishauf, Holtz, Goodman & Woodward

[57] ABSTRACT

A process for producing a norbornene polymer consisting essentially of a repeating unit of the formula (I)

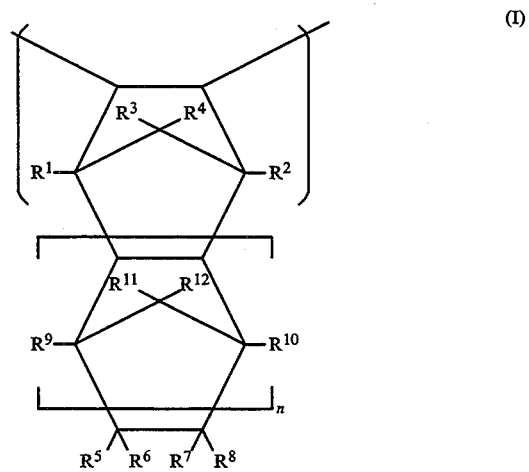

wherein $R^1$ to $R^{12}$ are the same or different and are hydrogen, $C_1$-$C_{20}$ hydrocarbon, or a group having a halogen, oxygen or nitrogen, $R^5$ and $R^7$ may combine to form a ring, and n is an integer of 0 or more; and having a weight average molecular weight as determined by GPC of $1\times10^5$ to $1\times10^7$. The process comprises polymerizing a norbornene monomer of the formula (II)

(Abstract continued on next page.)

(II)

wherein $R^1$ to $R^{12}$ are the same or different and are independently hydrogen, $C_1$-$C_{20}$ hydrocarbon, or a substituent containing a halogen atom, an oxygen atom or a nitrogen atom; $R^5$ and $R^7$ may combine together to form a ring; and n is an integer of 0 or more, in the presence of a catalyst containing a transition metal compound component containing a transition metal belonging to Group VB, VIB, VIIB or VIII of the Periodic Table, and an aluminoxane components.

21 Claims, 6 Drawing Sheets

PROCESS FOR PRODUCING A NORBORNENE POLYMER

This application is a division of application Ser. No. 07/664,372, filed Mar. 4, 1991, now abandoned.

BACKGROUND OF THE INVENTION

The present invention relates to a high molecular weight norbornene-based polymer having a specified structure which is excellent in properties such as mechanical strength, heat resistance and transparency, a process for efficiently producing said polymer, a film made of said polymer which is excellent in heat resistance and transparency, and a process for efficiently producing said film.

It is known that radical polymerization, cationic polymerization, polymerization using a Ziegler-type catalyst or polymerization using a metathesis catalyst of 2-norbornene or its derivatives results in polymers.

In polymerization of 2-norbornene using a catalyst such as $SnR_4/WCl_5$ or $ReCl_5$, ring opening polymerization proceeds, resulting in formation of a rubber-like polymer having the following structural formula:

(Norman G. Gaylord et al., J. Macromol. Sci-Chem., A 11 (5) 1053 (1977)). When $TiCl_4/Et_2AlCl$ or $Pd(C_6H_5CN)_2Cl_2$ is used as a catalyst, vinylene-type polymerization proceeds, resulting in formation of a polymer having the following structural

(U.S. Pat. No. 3,330,815).

However, in the case of the above $TiCl_4/Et_2AlCl$ catalyst, catalytic activity is as low as 54 to 64 g-polymer/g-Ti, and the molecular weight of the resulting polymer is only 550 to 750. Similarly, in the case of the $Pd(C_6H_5CN)_2Cl_2$ catalyst, catalytic activity is as low as 72 g-polymer/g-Pd, and the molecular weight of the resulting polymer is about 9,000.

As a result of investigations to produce a high molecular weight norbornene-based polymer having a vinylene-type structure which could not be produced, it has been found that polymerization of a norbornene-based monomer using a catalyst comprising a combination of a specified transition metal compound and a specified organometallic compound unexpectedly provides a norbornene-based polymer having a high molecular weight which could not be obtained, and furthermore mainly having a vinylene-type structure.

SUMMARY OF THE INVENTION

The present invention provides a norbornene-based polymer having mainly a repeating unit represented by the general formula (I):

wherein $R^1$ to $R^{12}$ may be the same or different and are independently a hydrogen atom, a hydrocarbon group having 1 to 20 carbon atoms, or a substituent containing a halogen atom, an oxygen atom or a nitrogen atom; $R^5$ and $R^7$ may combine together to form a ring; and n is an integer of 0 or more, and having a weight average molecular weight as determined by gel permeation chromatography of at least $2 \times 10^4$.

The present invention further provides a process for producing the above norbornene-based polymer which process comprises polymerizing a norbornene-based monomer represented by the general formula (II):

wherein all the symbols are the same as defined above, in the presence of a catalyst comprising mainly a transition metal compound component containing a transition metal belonging to the Periodic Table Group VB, VIB, VIIB or VIII, and an aluminoxane component.

The present invention further provides a film made of the above norbornene-based polymer.

The present invention further provides a process for producing the above film which comprises flow-extending a solution of the above norbornene-based polymer in an organic solvent, and then evaporating the organic solvent.

DETAILED DESCRIPTION OF THE INVENTION

In general formula (I), $R^1$ to $R^{12}$ represent as described above, a hydrogen atom, a hydrocarbon group having 1 to 20 carbon atoms, or a substituent containing a halogen atom, an oxygen atom or a nitrogen atom, and n represents an integer of 0 or more, preferably 0 to 3 and is usually 0 or 1.

Examples of the hydrocarbon group having 1 to 20 carbon atoms are an alkyl group having 1 to 20 carbon atoms, such as a methyl group, an ethyl group, a n-propyl group, an isopropyl group, a n-butyl group, an isobutyl group, a tert-butyl group or a hexyl group; an aryl, alkylaryl or arylalkyl group having 6 to 20 carbon atoms such as a phenyl group, a tolyl group or a benzyl group; an alkylidene group having 1 to 20 carbon atoms, such as a methylidene group, ethylidene group or propylidene group; and an alkenyl group having 2 to 20 carbon atoms such as a vinyl group or an allyl group.

It is to be noted, however, that $R^1$, $R^2$, $R^9$ and $R^{10}$ exclude an alkylidene group, and when any of $R^3$ to $R^8$ and $R^{11}$ to $R^{12}$ is an alkylidene group, the carbon atom to which the alkylidene group is connected does not have another substituent.

Examples of the substituent containing a halogen atom are a halogen group such as fluorine, chlorine, bromine or iodine, and a halogen-substituted alkyl group having 1 to 20 carbon atoms, such as a chloromethyl group, a bromomethyl group or a chloroethyl group.

Examples of the substituent containing an oxygen atom are alkoxy group having 1 to 20 carbon atoms, such as a methoxy group, an ethoxy group, a propoxy group or a phenoxy group, and an alkoxycarbonyl group having 1 to 20 carbon atoms, such as a methoxycarbonyl group or an ethoxycarbonyl group.

Examples of the substituent containing a nitrogen atom are an alkylamino group having 1 to 20 carbon atoms, such as a dimethylamino group or a diethylamino group, and a cyano group.

Examples of the norbornene-based polymer having the repeating unit represented by the general formula (I) are polynorbornene, poly(5-methylnorbornene), poly(5-ethylnorbornene), poly(5-propylnorbornene), poly(5,6-dimethylnorbornene), poly(1-methylnorbornene), poly(7-methylnorbornene), poly(5,5,6-trimethylnorbornene), poly(5-phenylnorbornene), poly(5-benzylnorbornene), poly(5-ethylidenenorbornene), poly(5-vinylnorbornene), poly(1,4,5,8-dimethano-1,2,3,4,4a,5,8,8a-octahydronaphthalene), poly(2-methyl-1,4,5,8-dimethano-1,2,3,4,4a, 5,8,8a-octahydronaphthalene), poly(2-ethyl-1,4,5,8-dimethano-1,2,3,4,4a,5,8,,8a-octahydronaphthalene), poly(2,3-dimethyl-1,4,5,8-dimethano-1,2,3,4,4a,5,8,8a-octahydronaphthalene), poly(1,2-dihydrodicyclopentadiene), poly(5-chloronorbornene), poly(5,5-dichloronorbornene), poly(5-fluoronorbornene), poly(5,5,6-trifluoro-6-trifluoromethylnorbornene), poly(5-chloromethylnorbornene), poly(5-methoxynorbornene), poly(5-dimethylaminonorbornene), and poly(5-cyanonorbornene).

The norbornene-based polymer of the present invention has mainly the vinylene-type structure, i.e., the structure resulting from polymerization of the norbornene-based monomer through a double bond thereof. This structure selectivity is quantitatively determined by a nuclear magnetic resonance method. More specifically, it is determined by calculating a ratio of signal of hydrogen in the —CH=CH— unit contained in the ring opening polymerization-type structure to all signal as measured by a $^1$H-NMR analysis.

The vinylene-type structure is a structure represented by the general formula (I), and the ring opening type structure is a structure represented by the following general formula:

(III)

wherein $R^1$ to $R^{12}$ and n has the same meanings as $R^1$ to $R^{12}$ and n in the general formula (I).

The polymer having mainly the vinylene-type structure as used herein means a polymer in which the ring opening-type structure unit as determined by the $^1$H-NMR method is not more than 50 mol % and preferably not more than 20 mol %.

The norbornene-based polymer of the present invention has a weight average molecular weight ($M_W$) as determined by gel permeation chromatography (GPC) of at least $2 \times 10^4$ preferably $1 \times 10^5$ to $1 \times 10^7$.

Measurement of $M_W$ by GPC can be carried out by the known method: for example, a method described below.

(1) Using a standard polystyrene whose molecular weight is known (produced by Toso Co., Ltd.), a molecular weight and a GPC count are measured, and a calibration curve between molecular weight and eluted amount is prepared.

(2) A sample is added to a 1,2,4-trichlorobenzene solvent so that the concentration is 7 mg/10 ml.

(3) The resulting mixture is heated to 160° C. and stirred at that temperature for 120 minutes to dissolve the sample in the solvent.

(4) After GPC measurement, the weight average molecular weight (as polystyrene) of the sample is calculated from the calibration curve.

GPC measuring conditions are as follows.

(1) Equipment: ALC/GPC-150C manufactured by Waters Corp.

(2) Column: TSK HM+GMH6×2 manufactured by Toso Co., Ltd.
(3) Injection amount: 400 μl
(4) Temperature: 135° C.
(5) Flow rate: 1.0 ml/min In the examples and comparative examples as described hereinafter, $M_w$ and $M_n$ were measured by the above method.

The norbornene-based polymer of the present invention is not always required to be a single compound; it may be a mixture of a norbornene-based polymer and a norbornene-based polymer of the ring opening-type structure, or a polymer with a norbornene-based polymer incorporated in a copolymer chain, as long as the ring opening-type unit is within the above range.

The norbornene-based polymer of the present invention can be efficiently produced by polymerizing a norbornene-based monomer represented by the general formula:

(II)

wherein $R^1$ to $R^{12}$ may be the same or different and are independently a hydrogen atom, a hydrocarbon group having 1 to 20 carbon atoms, or a substituent containing a halogen atom, an oxygen atom or a nitrogen atom, $R^5$ and $R^7$ may combine together to form a ring, and n is an integer of 0 or more, in the presence of a catalyst comprising mainly a transition metal compound component containing a transition metal belonging to the Periodic Table Group VB, VIB, VIIB or VIII, and an aluminoxane component.

The transition metal compound component comprises, as described above, a transition metal compound containing a transition metal belonging to the Periodic Table Group VB, VIB, VIIB or VIII.

Preferred examples of the transition metal are chromium, manganese, nickel, palladium, and platinum. Of these, nickel and palladium are particularly preferred.

Of various transition metal compounds, a compound represented by the general formula:

is particularly preferred.

In the general formula (IV), M represents a transition metal belonging to the Periodic Table Group VB, VIB, VIIB or VIII, and a, b, c and d each represent an integer of 0 to 7. $R^{13}$ to $R^{16}$ may be the same or different, and a plurality of groups of $R^{13}$ to $R^{16}$ may combine together to form a ring.

In the general formula (IV), $R^{13}$ to $R^{16}$ are each a hydrogen atom; a halogen atom such as fluorine, chlorine, bromine or iodine; an oxygen atom; an alkyl group having 1 to 20 carbon atoms, such as a methyl group, an ethyl group, a n-propyl group, an isopropyl group, a n-butyl group, a tert-butyl group, an isobutyl group, an octyl group or a 2-ethylhexyl group; an alkoxy group having 1 to 20 carbon atoms, such as a methoxy group, an ethoxy group, a propoxy group, a butoxy group or a phenoxy group; an aryl, alkylaryl or arylalkyl group having 6 to 20 carbon atoms, such as a phenyl group, a tolyl group, a xylyl group or a benzyl group; an acyloxy group having 1 to 20 carbon atoms, such as a heptadecylcarbonyloxy group; an indenyl group; a fluorenyl group; a cyclopentadienyl group; a substituted cyclopetadienyl group such as a methylcyclopentadienyl group, an ethylcyclopentadienyl group, a 1,2-dimethylcyclopentadienyl group, a tetramethylcyclopentadienyl group or a pentamethylcyclopentadienyl group; a π-allyl group; a substituted allyl group; an acetylacetonate group; a substituted acetylacetonate group; a substituted silyl group containing a silicon atom, such as a trimethylsilyl group or a (trimethylsilyl)methyl group; a carbonyl group, an oxygen atom, a nitrogen atom, ethylene; Lewis bases, e.g., ethers such as diethyl ether, tetrahydrofuran (THF) or dimethyl ether, esters such as ethyl benzoate, nitriles such as acetonitrile or benzonitrile, amines such as triethylamine, 2,2'-bipyridine or phenanethroline, phosphines such as triethylphosphine or triphenylphosphine, isocyanides, phosphoric acids, and thiocyanates; and cyclic unsaturated hydrocarbons such as benzene, toluene, xylene, cycloheptatriene, cyclooctadiene, cyclooctatriene, cyclooctatetraene or their derivatives.

In the substituent groups of $R^{13}$ to $R^{16}$, the substitute is preferably an alkyl group.

Other transition metal compounds as derived from the general formula (IV) can be used effectively as the catalyst component of the present invention.

Examples of the chromium compound are tetreamethylchromium, tetra(tert-butoxy)chromium, bis(cyclopentadienyl)chromium, hydridotricarbonyl(cyclopentadienyl)chromium, hexacarbonyl(cyclopentadienyl)chromium, bis(benzene)chromium, tricarbonyltris(triphenyl phosphonate)chromium, tris(allyl)chromium, triphenyltris(tetrahydrofuran)chromium, and chromium tris(acetylacetonate).

Examples of the manganese compound are tricarbonyl(cyclopentadienyl)manganese, pentacarbonylmethylmanganese, bis(cyclopentadienyl)manganese, and manganese bis(acetylacetonate).

Examples of the nickel compouns are dicarbonylbis(triphenylphosphine)nickel, dibromobis(triphenylphosphine)nickel, dinitrogenbis[bis(tricyclohexylphosphine)nickel], chlorohydridobis(tricyclohexylphosphine)nickel, chloro(phenyl)bis(triphenylphosphine)nickel, dimethylbis(trimethylphosphine)nickel, diethyl(2,2'-bipyridyl)nickel, bis(allyl)nickel, bis(cyclopentadienyl)nickel, bis(methylcyclopentadienyl)nickel, bis(pentamethylcyclopentadienyl)nickel, allyl(cyclopentadienyl)nickel, (cyclopentadienyl) (cyclooctadiene)nickel tetrafluoroborate, bis(cyclooctadiene)nickel, nickel bisacetylacetonate, allylnickel chloride, tetrakis(triphenylphosphine)nickel, nickel chloride, $(C_6H_5)Ni\{OC(C_6H_5)CH=P(C_6H_5)_2\}$ $\{P(C_6H_5)_3\}$ and $(C_6H_5)Ni\{OC(C_6H_5)C(SO_3Na)=P(C_6H_5)_2\}$ $\{P(C_6H_5)_3\}$.

Examples of the palladium compound are dichlorobis(benzonitrile) palladium, carbonyltris (triphenylphosphine) palladium, dichlorobis(triethylphosphine) palladium, bis(tert-butyl-iso-cyanide) palladium, palladium bis(acetylacetonate), dichloro(tetraphenylcyclobutadiene)palladium, dichloro(1,5-cyclooctadiene)palladium, allyl(cyclopentadienyl)palladium, bis(allyl) palladium, allyl(1,5-cyclooctadiene)palladium tetrafluoroborate, (acetylacetonate) (1,5-cyclooctadiene)palladium tetrafluoroborate, and tetrakis (acetonitrile)palladium bis(tetrafluoroborate). In these examples, the nickel compounds are preferable to obtain a norbornene-based polymers having a high weight average molecular weight, especially having a weight average molecular weight of not less than $1 \times 10^5$.

The aluminoxane component constituting the main component of the catalyst in combination with the above transition metal compound component is a compound obtained by contacting an organoaluminum compound and water.

As the organoaluminum compound to be used as the starting material for the aluminoxane component, an organoaluminum compound represented by the general formula:

$$AlR^{17}_3 \qquad (V)$$

wherein $R^{17}$ is at least one alkyl group having 1 to 8 carbon atoms is usually employed.

Examples of the organoaluminum compound represented by the general formula (V) are trimethylaluminum, triethylaluminum and triisobutylaluminum. Of these, trimethylaluminum is most preferred.

As the water to be contacted with the above organoaluminum compound, the usual water, ice or various water-containing compounds such as solvent saturated water, water adsorbed on an inorganic material, or crystal water contained in metal salt, e.g., $CuSO_4.5H_2O$ can be employed.

Specific examples of the reaction product between the organoaluminum compound exemplified by alkylaluminum and water, i.e., the aluminoxane component are chain-like alkylaminoxane represented by the general formula:

$$\begin{array}{c} R^{17} \\ \diagdown \\ / \\ R^{17} \end{array} Al-O(-Al-O)_m^{R^{17}} Al \diagup^{R^{17}}_{\diagdown R^{17}} \qquad (VI)$$

wherein $R^{17}$ is the same as defined above, and m represents a degree of polymerization, and cyclic alkylaminoxane having a repeating unit represented by the general formula:

$$(-Al-O-) \atop R^{17} \qquad (VII)$$

wherein the number of repeating units is usually 4 to 52. In the general formula, m is usually 2 to 50.

Usually, the contacting product of an organoaluminum compound such as trialkyl aluminums and the like and water is a mixture of, besides the above mentioned chain-like alkyl aluminoxanes and cyclic alkyl aluminoxanes, the unreacted trialkyl aluminum and various kinds of condensation products or, further, a molecule by complicated association thereof and can be a variety of products depending on the contacting conditions of the trialkyl aluminum and water.

The reaction of the organoaluminum compound and water is not particularly limitative and can be carried out according to the known technique. For example, (1) a method in which an organoaluminum compound is dissolved in an organic solvent and then contacted with water, (2) a method in which at the time of polymerization, the organoaluminum compound is first added, and then water is added, (3) a method in which crystal water contained in a metal salt, for example, or water adsorbed on an inorganic or organic material is reacted with an organoaluminum compound, (4) a method in which tetraalkyldialuminoxane is reacted with trialkylaluminum, and (5) a method in which the reaction product obtained in method (4) is further reacted with water can be employed.

The reaction is preferably carried out in a solvent although it proceeds in the absence of a solvent. Preferred examples of the solvent are aliphatic hydrocarbon such as hexane, heptane or decane, and aromatic hydrocarbons such as benzene, toluene or xylene.

In the method of the present invention, the aluminoxane component can be used in various embodiments; for example, an embodiment in which the aluminoxane component is used singly, an embodiment in which the aluminoxane component is mixed with an organoaluminum compound (e.g., compound represented by the general formula (V)), an embodiment in which the aluminoxane component is mixed with other organometallic compound, and an embodiment in which the aluminoxane component is absorbed or deposited on an inorganic material, for example.

The catalyst to be used in the present invention contains the transition metal compound component and the aluminoxane component as main components. In addition, the catalyst may contain other organometallic compound, for example, if necessary.

In accordance with the process of the present invention, a norbornene-based monomer represented by the general formula (II) is polymerized in the presence of the above catalyst to produce a norbornene-based polymer having a repeating unit represented by the general formula (I).

That is, in the process of the present invention, the norbornene-based monomer represented by the general formula (II) is used as the starting material.

In the general formula (II), $R^1$ to $R^{12}$ represent a hydrogen atom, a hydrocarbon group having 1 to 20 carbon atoms, or a substituent containing a halogen atom, an oxygen atom or a nitrogen atom, and $R^5$ and $R^7$ may combine together to form a ring. $R^1$ to $R^{12}$ may be the same or different. n is an integer of 0 or more, preferably 0 to 3: usually it is 0 or 1.

The substituent is the same as in the general formula (I).

Examples of the hydrocarbon group having 1 to 20 carbon atoms are an alkyl group having 1 to 20 carbon atoms, such as a methyl group, an ethyl group, a n-propyl group, an isopropyl group, a n-butyl group, an isobutyl group, a tert-butyl group or a hexyl group; an aryl, alkylaryl or arylalkyl group having 6 to 20 carbon atoms, such as a phenyl group, a tolyl group or a benzyl group; an alkylidene group having 1 to 20 carbon atoms, such as a methylidene group, an ethylidene group or a propylidene group; and an alkenyl group having 2 to 20 carbon atoms, such as a vinyl group or an allyl group.

It is to be noted, however, that $R^1$, $R^2$, $R^9$ and $R^{10}$ exclude an alkylidene group. When any one of $R^3$ to $R^8$ and $R^{11}$ to $R^{12}$ is an alkylidene group, the carbon atom to which the group is connected does not have other substituent.

Examples of the substituent containing a halogen atom are a halogen group such as fluorine, chlorine, bromine or iodine, and a halogen-substituted alkyl group having 1 to 20 carbon atoms, such as a chloromethyl group, a bromomethyl group or a chloroethyl group.

Examples of the substituent containing an oxygen atom are an alkoxy group having 1 to 20 carbon atoms, such as a methoxy group, an ethoxy group, a propoxy group or a phenoxy group; and a carboxyester group having 1 to 20 carbon atoms, such as a carboxymethylester group or a carboxyethylester group.

Examples of the substituent containing a nitrogen atom are an alkylamino group having 1 to 20 carbon atoms, such as a dimethylamino group or a diethylamino group, and a cyano group.

Examples of the norbornene-based monomer represented by the general formula (II) are norbornene,5-methylnornornene, 5-ethylnorbornene, 5-propylnorbornene, 5,6-dimethylnorbornene, 1-methylnorbornene, 7-methylnorbornene, 5,5,6-trimethylnorbornene, 5-phenylnorbornene, 5-benzylnorbornene, 5-ethylidenenorbornene, 5-vinylnorbornene, 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 1,2-dihydrodicyclopentadiene, 5-chloronorbornene, 5,5-dichloronorbornene, 5-fluoronorbornene, 5,5,6-trifluoro-6-trifluoromethylnorbornene, 5-chloromethylnorbornene, 5-methoxynorbornene, end 5-dimethylaminonorbornene.

Although the ratio of the transition metal compound component to the aluminoxane component in the catalyst of the present invention varies with various conditions and cannot be determined unconditionally, it usually suffices that the ratio, i.e., aluminum/transition metal (molar ratio), is 1 to $10^6$ and preferably 10 to $10^4$.

Polymerization may be carried out in a bulky form, or in a solvent of aliphatic hydrocarbon such as pentane, hexane or heptane, alicyclic hydrocarbon such as cyclohexane, or aromatic hydrocarbon such as benzene, toluene or xylene. Although the polymerization temperature is not particularly limitative, it is generally $-30°$ C. to $+150°$ C. and preferably $-10°$ C. to $+120°$ C.

In order to control the molecular weight of the objective norbornene-based polymer, the amount of the transition metal used and the polymerization temperature are chosen depending on the object, or the polymerization reaction is carried out in the presence of hydrogen.

In this manner, a norbornene-based polymer having a weight average molecular weight of at least 20,000, preferably $1 \times 10^5$ to $1 \times 10^7$ is obtained.

The film of the present invention is produced from the norbornene-based polymer having the repeating unit represented by the general formula (I). Although the film of the present invention is not always, limited in thickness, the film thickness is usually 0.5 to 1,000 $\mu$m and preferably 1 to 500 $\mu$m.

The film of the present invention has markedly high transparency, and holds a modulus of elasticity over a range from room temperature to about 360° C. and similarly an even dielectric constant; it has markedly excellent heat resistance.

The film of the present invention is obtained by flow-extending a solution of the norbornene-based polymer having mainly the repeating unit represented by the general formula (I) in an organic solvent and then evaporating the organic solvent. More specifically the above norbornene-based polymer is dissolved in an organic solvent capable of dissolving the polymer to prepare the solution, or the above norbornene-based monomer is polymerized in an organic solvent capable of dissolving the resulting polymer and the organic solvent solution thus obtained is used as such.

Any organic solvent capable of dissolving the norbornene-based polymer having the repeating unit represented by the general formula (I) at room temperature or at elevated temperature can be employed. Usually at least one solvent selected from aromatic hydrocarbons, alicyclic hydrocarbons and halogenated hydrocarbons is used.

Examples of the aromatic hydrocarbon are benzene, toluene, xylene, ethylbenzene, methylnaphthalene, and tetraline.

Examples of the alicyclic hydrocarbon are cyclohexane, cyclohexene, methylcyclohexane, ethylcyclohexane, and decahydronaphthalene.

Examples of the halogenated hydrocarbon are dichloromethane, chloroform, carbon tetrachloride, dichloroethane, trichloroethane, tetrachloroethane, trifluoroethane, trichlene, chlorobenzene, dichlorobenzene, trichlorobenzene, and the like.

These organic solvents can be used singly or as mixtures comprising two or more thereof.

In accordance with the process of the present invention, as described above, the norbornene-based polymer having mainly the vinylene-type structure is dissolved in an organic solvent. The concentration of the polymer in the resulting solution is preferably 0.1 to 20% by weight, although it is not always limited. If the concentration of the polymer is too low, a film having the desired thickness is difficult to form by a single operation according to the flow-extending method or the coating method and, furthermore, the amount of the organic solvent used is large, which is not desirable from an economic standpoint. On the other hand, if the concentration of the polymer is too high, the organic solvent solution is increased in viscosity, forming a gel-like material and becoming uneven in composition, and thus handling and molding undesirably become difficult.

To the organic solvent solution, if desired, various additives soluble in the organic solvent used, such as an antioxidant, a ultraviolet absorbing agent, a heat stabilizer, a flame retardant, an antistatic agent, and a colorant, can be added.

In the process of the present invention, the organic solvent solution thus prepared may be used as it is, or may be used after removal of insoluble materials remaining in the organic solvent solution by means such as filtration, if necessary.

The above filtration is usually carried out under pressure by the use of a filter medium, such as cotton cloth, flannel, glass wool, calico or a combination thereof.

If there are air bubbles in the organic solvent solution, these bubbles may be removed by a suitable technique, if necessary.

The organic solvent solution is flow-extended on the surface of a support comprising metal or glass, for example, having a smooth and even surface and, thereafter, the organic solvent is evaporated.

In flow-extending the organic solvent solution on a commercial scale, it is preferred to use a metallic support.

As the metallic support, those made of nickel, chromium, copper or stainless steel, nickel-plated supports, those comprising an iron basic metal layer, a steel layer provided on the basic layer, and a nickel layer provided on the steel layer, and those comprising an iron basic layer, and an alloy layer of nickel and chromium as provided on the basic layer can be used.

A method of evaporating the organic solvent is not always critical; any of a method of evaporating the organic solvent at room temperature, a method of evaporating the organic solvent at an elevated temperature, and a method of evaporating the organic solvent under ordinary pressure or under reduced pressure can be employed.

The norbornene-based polymer of the present invention is a novel norbornene-based polymer having a high molecular weight and the vinylene-type structure.

The novel norbornene-based polymer of the present invention is excellent in mechanical properties, heat resistance and solubility in an organic solvent, and further transparent, and thus can be widely used as a material for production of various moldings.

In accordance with the process of the present invention, as well as the above novel norbornene-based polymer, various norbornene-based polymers can be produced with high activity and high yield.

The film of the present invention is excellent in transparency, is not changed in viscoelastic characteristics and electric characteristics to markedly high temperatures, and has excellent heat resistance. Thus the film is suitable for use as a condensor film or an insulative film.

In accordance with the process of the present invention, the film having excellent properties can be produced with high ease and high efficiency.

The present invention is described in greater detail with reference to the following examples.

EXAMPLE 1

Preparation of Norbornene-Based Polymer (1) Preparation of Aluminoxane

In a 1,000-milliliter glass container purged with argon, 74 g (0.30 mol) of copper sulfate pentahydrate ($CuSO_4.5H_2O$), 500 ml of toluene and 74 ml (0.78 mol) of trimethylaluminum were placed, and they were reacted at 20° C. for 30 hours. Then a solid portion was removed by filtration, and the toluene and unreacted trimethylaluminum were removed under reduced pressure. As a result, 17.7 g of methylaluminoxane was obtained, which was colorless and in a powder form, and had a molecular weight of 840 as determined by the freezing point depression method using benzene. This methylaluminoxane was dissolved in 50 ml of toluene and used as a catalyst component.

(2) Polymerization of 2-Norbornene

In a 30-milliliter glass container, 3.0 ml of toluene and 0.5 mmol as an aluminum atom of the methylaluminoxane obtained in (1) above were placed, and then 2.5 micromoles of nickel bisacetylacetonate was added. Subsequently 7.7 ml of a toluene solution containing 70% by weight of 2-norbornene (2-norbornene 50 mmol) was added, and then polymerization was conducted at 50° C. for 4 hours. Then methanol was added to terminate the polymerization reaction, and a mixed solution of hydrochloric acid and methanol was added to decompose the catalyst component. After drying, 3.47 g of a polymer (polynorbornene) was obtained.

Catalytic activity per gram of nickel atom was 23.6 kg-polymer/g-nickel. The weight average molecular weight of the polynorbornene as determined by GPC was 2,220,000, and the number average molecular weight was 705,000. The reduced viscosity, $\eta$ sp/c, determined at 135° C. in 1,2,4trichlorobenzene was 2.66 dl/g (concentration 0.1 g/dl).

Figure 1:
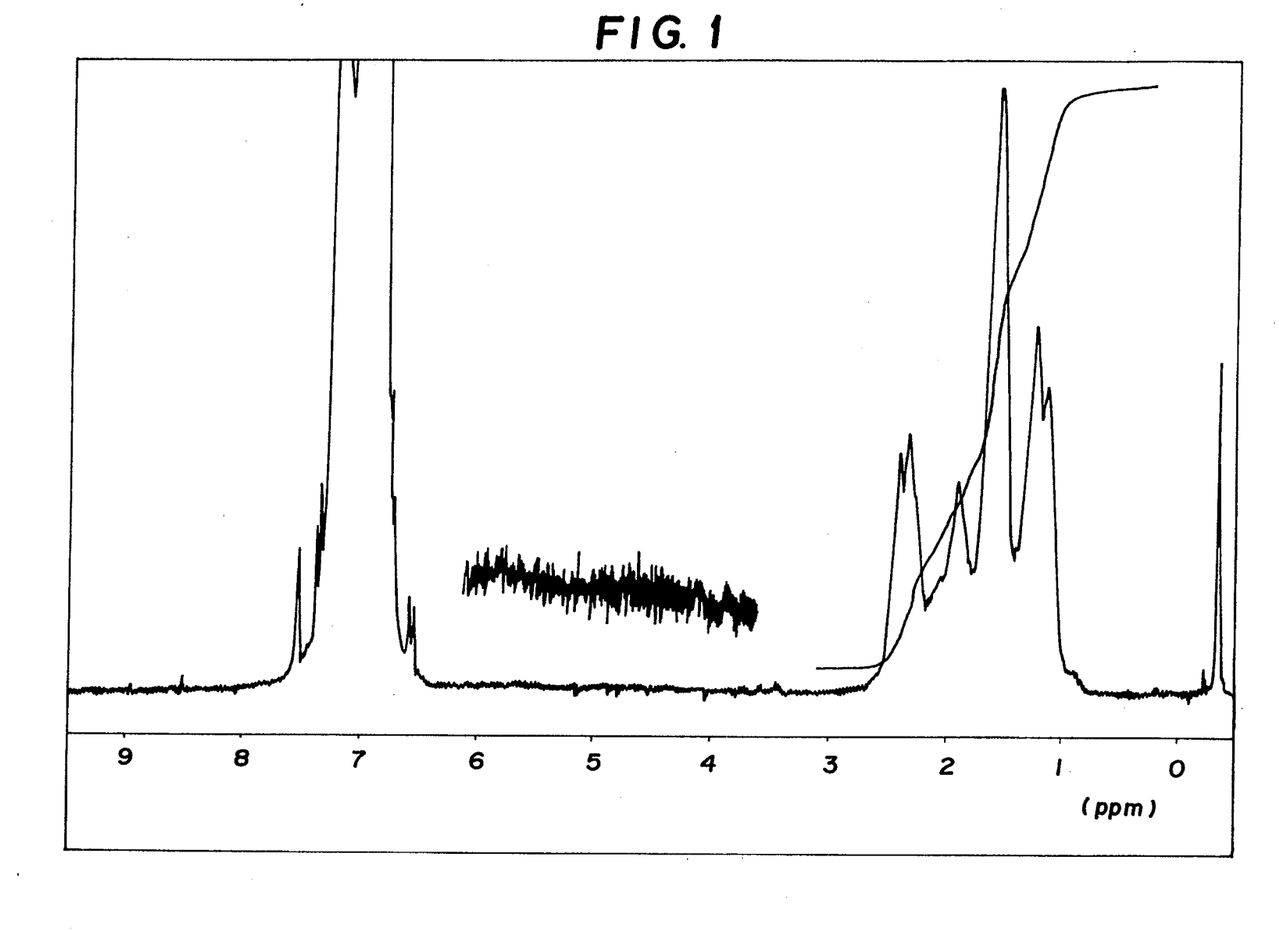
FIG. 1 is a $^1$H-NMR spectrum of the polynorbornene obtained in Example 1 in 1,2,4-trichlorobenzene.
Figure 2:
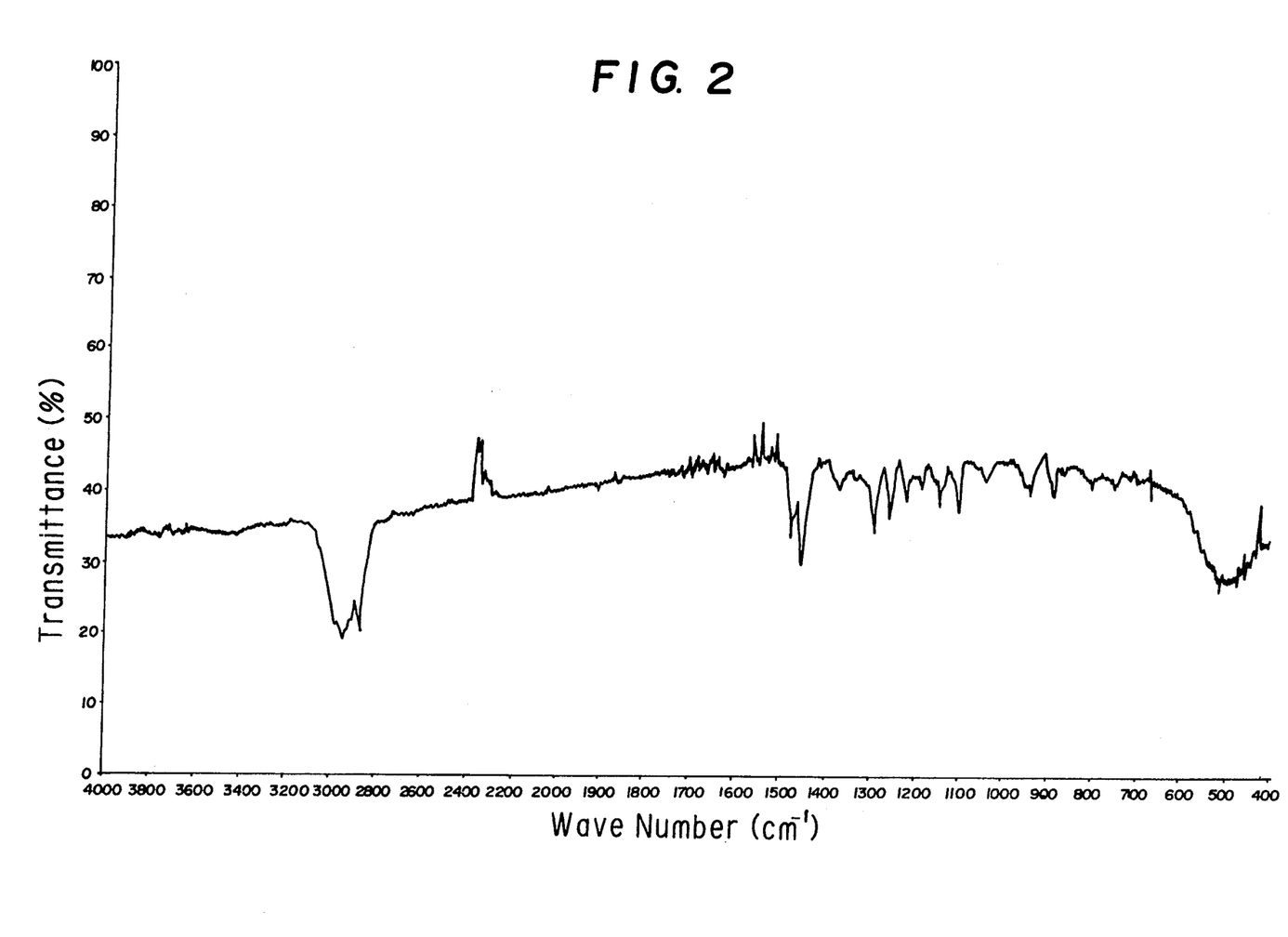
FIG. 2 is an IR absorption spectrum of the polynorbornene obtained in Example 1.

A $^1$H-NMR spectrum of the polynorbornene is shown in FIG. 1, and its infrared ray (IR) absorption spectrum is shown in FIG. 2.

(3) Production of Film

In a 300-milliliter flask, 2.0 g of the polymer obtained in (2) above and 98 g of 1,2,4-trichlorobenzene were placed, which were then stirred at 150° C. on an oil bath while heating to obtain a uniform solution.

This solution was flow-extended on a glass plate, and the solvent was removed under reduced pressure by the use of a vacuum drier maintained at 100° C. After confirming that the solvent was almost removed, the temperature was raised to 200° C. and the film was completely dried to obtain a 100 $\mu$m thick film.

The film thus obtained was measured for transparency by the use of a direct-reading Haze Computer HGM-2DP manufactured by Suga Shikenki Co., Ltd. The total light transmittance was 92.7% and haze was 5.1%.

Figure 3:
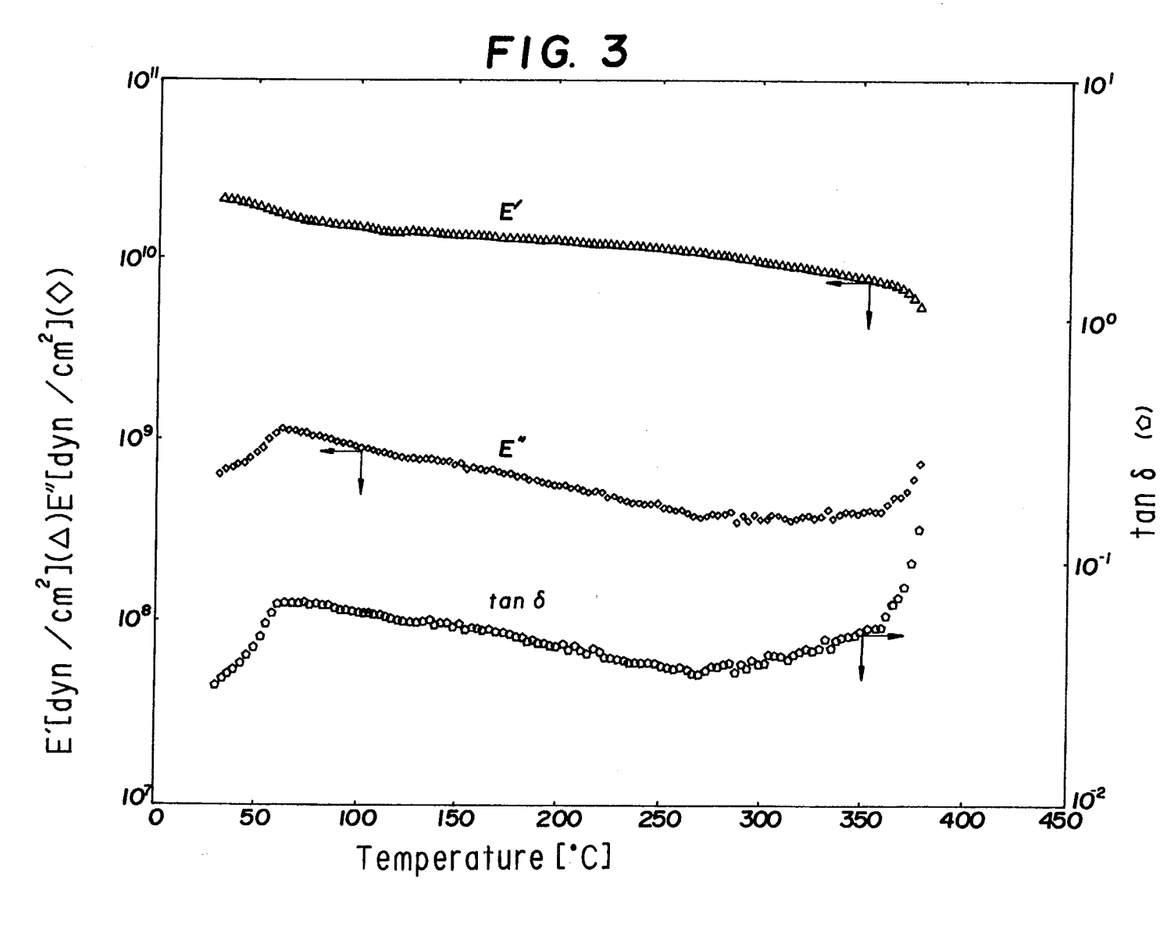
FIG. 3 is a graph illustrating temperature dependency of kinematic viscoelasticity of the polynorbornene obtained in Example 1, wherein E' indicates storage elastic modulus, E" indicates loss modulus, and tan δ indicates loss tangent.
Figure 4:
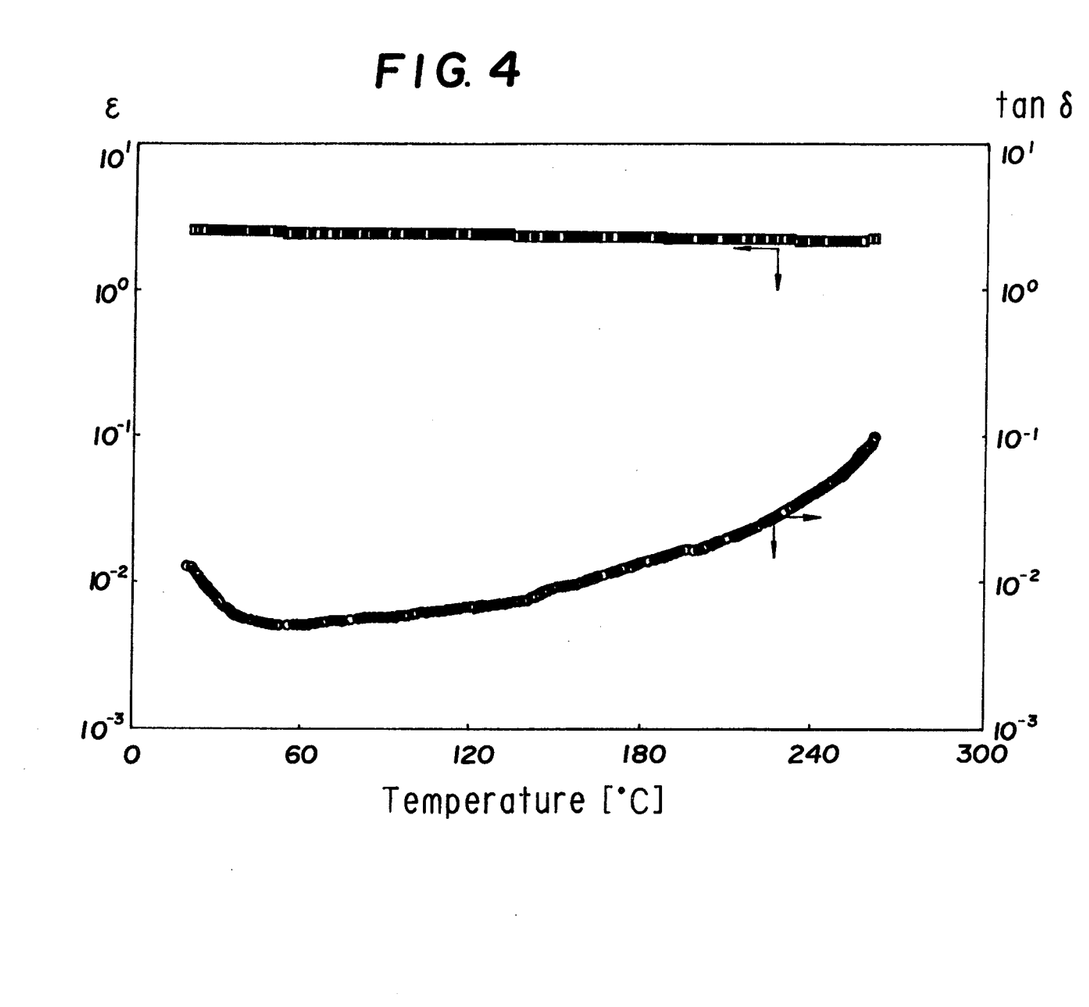
FIG. 4 is a graph illustrating temperature dependency of dielectric constant ε and dielectric loss tangent tan δ of the polynorbornene obtained in Example 1.

The film was further measured for kinematic viscoelasticity by the use of Viscoelastic Analyzer RSA-II manufactured by Reometrics Far East Co., Ltd. The results are shown in FIG. 3. In this measurement, frequency was 1 Hz, temperature-raising speed was 3° C./min, and strain was 0.1%.

Astonishingly, storage modulus, E', and loss tangent, tan $\delta$, were both almost constant from room temperature to 360° C., and the film held modulus even in the high temperature region. This shows that the film has excellent heat resistance.

Electric properties were measured by the use of a dielectric constant measuring equipment manufactured by Toyo Seiki Co., Ltd. The results are shown in Table 4. This measurement was carried out from 20° C. to 260° C. under conditions of frequency 9.8 Hz and temperature-raising speed 2° C./min. Both dielectric constant, e, and dielectric loss, tan $\delta$, were almost constant up to 260° C.

COMPARATIVE EXAMPLE 1

In a 30-milliliter glass container, 0.1 mmol of tungsten hexachloride and 0.4 mmol of diethylaluminum monochloride were placed, and then upon addition of 14.0 ml of a toluene solution containing 70% by weight of 2-norbornene (2-norbornene 91 mmol), heat was immediately generated and solidification occurred. Immediately, methanol was injected to terminate the reaction and a mixed solution of hydrochloric acid and methanol was added to decompose the catalyst component. After removal of the decomposed material followed by drying, a rubber-like polymer was obtained.

Figure 5:
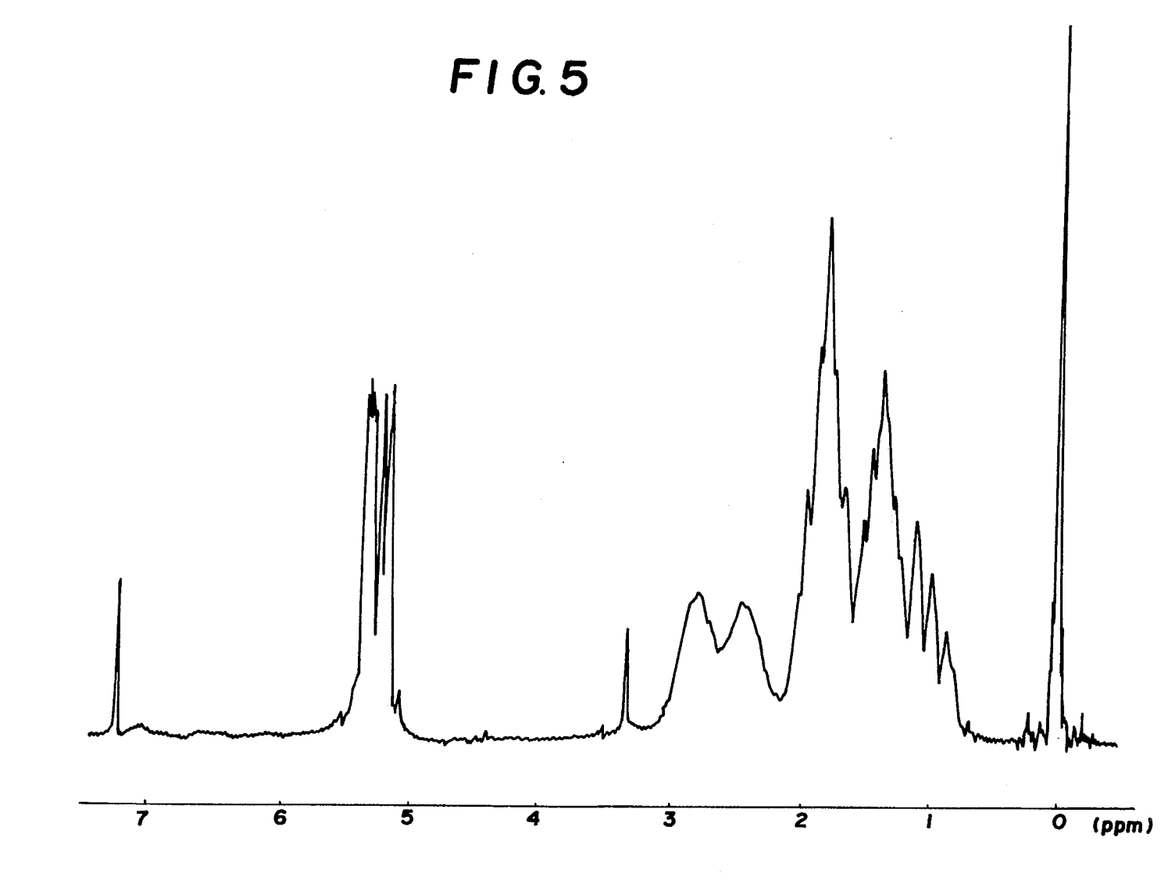
FIG. 5 is a $^1$H-NMR spectrum of a chloroform-soluble portion of the polymer obtained in Comparative Example 1 in $CDCl_3$.
Figure 6:
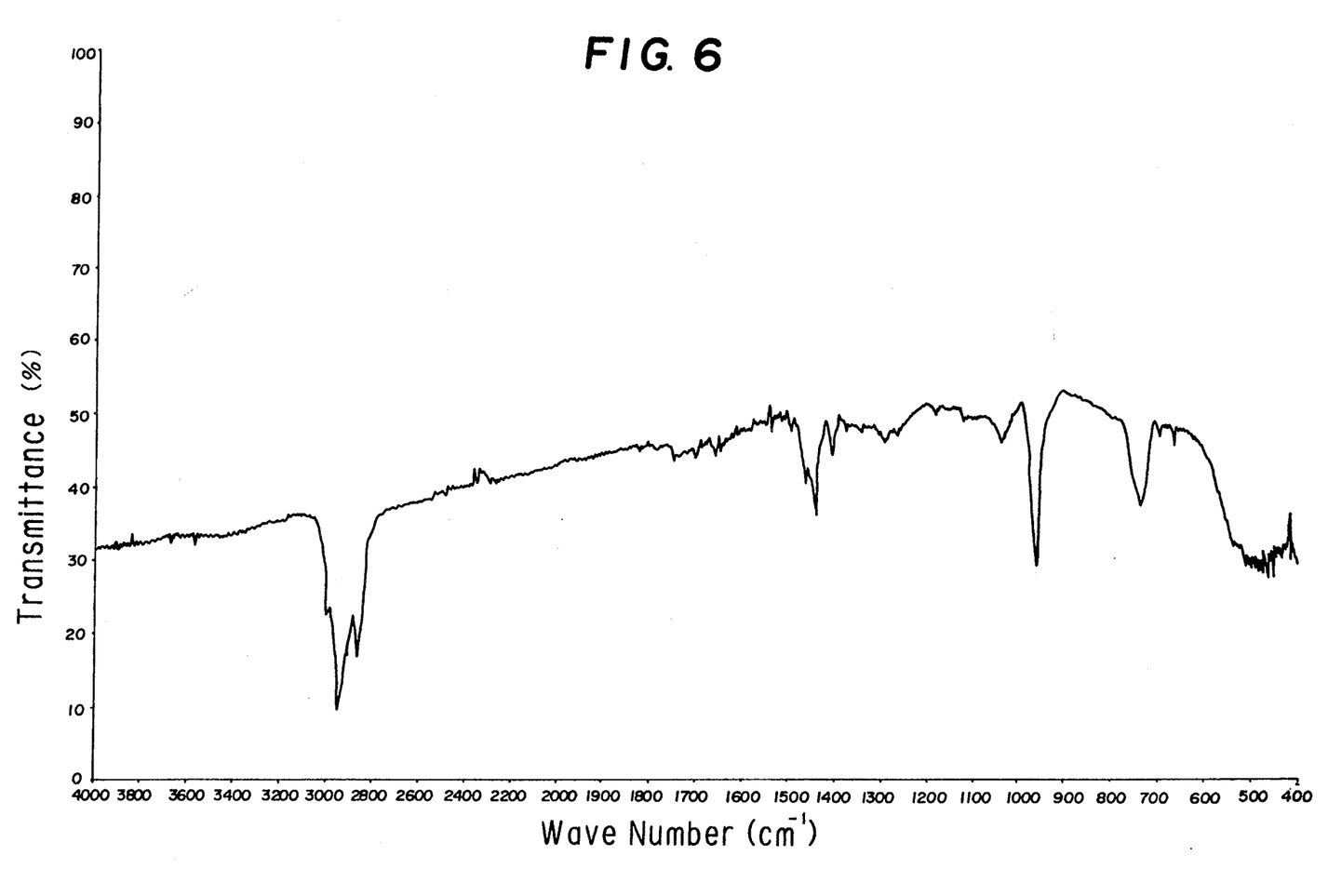
FIG. 6 is an IR absorption spectrum of the polymer obtained in Comparative Example 1.

A $^1$H-NMR spectrum of a chloroform-soluble portion of the polymer is shown in FIG. 5, and in FIG. 6, an IR spectrum of the polymer is shown.

The following spectral data confirmed that the polymer obtained in Example 1 had the vinylene-type structure.

(1) $^1$H-NMR Spectrum

In the polymer of Comparative Example 1, absorptions ascribable to cis and trans-type double bonds are observed in the region of 5 to 6 ppm, while on the other hand in the polymer of Example 1, no absorption is observed in the same region. This shows that the polymer of Example 1 is entirely of the vinylene-type structure.

(2) IR Absorption Spectrum

In the polymer of Comparative Example 1, peaks ascribable to cis—CH=CH— and trans —CH=CH— group are observed at 740 cm$^{-1}$ and 965 cm$^{-1}$, respectively, while on the other hand in the polymer of Example 1, there are no peaks at 740 cm$^{-1}$ and 965 cm$^{-1}$, and at 1298 cm$^{-1}$, a peak ascribable to the methylene group located at 7-position of the vinylene-type structure is observed. This shows that the polymer of Example 1 is entirely of the vinylene-type structure.

EXAMPLE 2

In the same manner as in Example 1 (2) except that 2.5 micromoles of allylcyclopentadienylnickel was used in place of 2.5 micromoles of nickel bisacetylacetonate, 1.21 g of a polymer (polynorbornene) was obtained.

Catalytic activity per gram of nickel atom was 8.25 kg/polymer/g-nickel.

The weight average molecular weight of the polynorbornene thus obtained as determined by GPC was 1,880,000, and the number average molecular weight was 779,000. The reduced viscosity, $\eta$ sp/c, as measured in 1,2,4-trichlorobenzene at 135° C. (concentration 0.1 g/dl) was 2.57 dl/g.

The $^1$H-NMR spectrum and IR absorption spectrum of the polynorbornene were in good agreement with those of Example 1.

EXAMPLES 3 TO 16

In the same manner as in Example 1 (2) except that 2.5 micromoles of a transition metal compound component shown in Table 1 was used in place of 2.5 micromoles of nickel bisacetylacetonate, a polymer (polynorbornene) was obtained.

The yield, catalytic activity and molecular weight of the polymer are shown in Table 1.

The $^1$H-NMR and IR absorption spectra of the polymers were in good agreement with those of Example 1.

tetrachloride was used in place of nickel bisacetylacetonate, 0.65 g of a polymer was obtained.

Catalytic activity per gram of titanium atom was 0.054 kg,polymer/g-titanium.

The weight average molecular weight of the polynorbornene as determined by GPC was 6,200, and the number average molecular weight was 2,670.

In order to measure physical properties of the polymer, a cast film was produced using 1,2,4-trichlorobenzene as a solvent, but this film was very brittle and could not be measured for physical properties. On heating the film, it melted at about 180° C.

COMPARATIVE EXAMPLE 3

In the same manner as in Example 1 (2) except that methylaluminoxane was not used, a polymer was intended to produced, but with no formation of any polymer.

COMPARATIVE EXAMPLE 4

In the same manner as in Example 1 (2) except that 0.5 mmol of trimethylaluminum was used in place of methylaluminoxane, a polymer was intended to produce, but with no formation of any polymer.

COMPARATIVE EXAMPLE 5

In the same manner as in Example 1 (2) except that 0.5 mmol of diethylaluminum monochloride was used in place of methylaluminoxane, and in place of 2.5 micromoles of nickel bisacetylacetonate, 62.5 micromoles of bis (acetylacetonate)vanazyl was used, 0.01 g of a polymer was obtained.

The analysis of a $^1$H-NMR spectrum and an IR absorption spectrum of the polymer showed that the polymer was a trans-type ring-opened polymer.

COMPARATIVE EXAMPLE 6

In the same manner as in Example 1 (2) except that 0.5 mmol of triisobutylaluminum was used in place of methylaluminoxane, and in place of 2.5 micromoles of nickel bisacetylacetonate, 1 mmol of titanium tetrachloride was used, 2.41 g of a polymer was obtained.

Catalytic activity per gram of titanium atom was 0.050 kg-polymer/g-titanium.

The weight average molecular weight of the polynorbornene as determined by GPC was 4,180, and the

TABLE 1

| Example | Transition Metal Compound Component | Yield of Polymer (g) | Catalytic Activity kg-polymer/g-transition metal | Molecular Weight | |
| --- | --- | --- | --- | --- | --- |
| | | | | Mn | Mw |
| 3 | Biscyclooctadienylnickel | 1.73 | 11.8 | 705,000 | 2,220,000 |
| 4 | Biscyclopentadienylnickel | 1.00 | 6.81 | 1,350,000 | 2,840,000 |
| 5 | Tetrakis(triphenylphosphine)nickel | 0.08 | 0.54 | 99,700 | 234,000 |
| 6 | Chloro(phenyl)bis(triphenylphosphine)nickel | 0.11 | 0.75 | 143,000 | 646,000 |
| 7 | (C$_6$H$_5$)Ni{OC(C$_6$H$_5$)$_2$CH=P(C$_6$H$_5$)$_2$}{P(C$_6$H$_5$)$_3$} | 0.63 | 4.3 | 206,000 | 577,000 |
| 8 | Nickel chloride | 0.83 | 5.7 | 1,260,000 | 3,550,000 |
| 9 | Dichloro(1,5-cyclooctadiene)palladium | 2.60 | 9.77 | — | — |
| 10 | Dichlorobis(benzonitrile)palladium | 0.12 | 0.45 | — | — |
| 11 | Tetrakis(triphenylphosphine)palladium | 0.10 | 0.38 | — | — |
| 12 | Palladium bis(acetylacetonate) | 0.98 | 3.7 | — | — |
| 13 | Palladium chloride | 0.29 | 1.1 | — | — |
| 14 | Bis(cyclopentadienyl)chromium | 0.02 | 0.15 | 10,500 | 29,300 |
| 15 | Chromium bis(acetylacetonate) | 0.08 | 0.62 | 6,940 | 29,800 |
| 16 | Manganese bis(acetylacetonate) | 0.10 | 0.73 | 1,070,000 | 4,020,000 |

COMPARATIVE EXAMPLE 2

In the same manner as in Example 1 (2) except that 0.5 mmol of diethylaluminum monochloride was used in place of methylaluminoxane, and 0.25 mmol of titanium number average molecular weight was 1,260. With this polymer, no cast film permitting measurement of physical properties was obtained; it melted at about 170° C.

COMPARATIVE EXAMPLE 7

In the same manner as in Example 1 (2) except that 2.5 micromoles of dicyclorobis (benzonitrile)palladium was used in place of methylaluminoxane and nickel bisacetylacetonate, 0.02 g of a polymer was obtained.

Catalytic activity per gram of palladium atom was 0.075 kg-polymer/g-palladium.

The weight average molecular weight of the polynorbornene as determined by GPC was 3,130, and the number average molecular weight was 1,780. With this polymer, no cast film permitting measurement of physical properties was obtained, and it melted at about 160° C.

EXAMPLE 17

In the same manner as in Example 1 (2) except that the amount of methylaluminoxane used was changed to 0.25 mmol, and 0.25 mmol of trimethylaluminum was added, 2.12 g of a polymer was obtained.

Catalytic activity per gram of nickel atom was 14.4 kg-polymer/g-nickel.

The weight average molecular weight of the polynorbornene as determined by GPC was 2,520,000, and the number average molecular weight was 1,280,000. The reduced viscosity, $\eta$ sp/c, measured at 135° C. in 1,2,4-trichlorobenzene (concentration 0.1 g/dl) was 5.36 dl/g.

The $^1$H-NMR spectrum and IR absorption spectrum of the polynorbornene were in good agreement with those of the polymer of Example 1.

EXAMPLE 18

In the same manner as in Example 17 except that 0.25 mmol of triisobutylaluminum was used in place of trimethylaluminum, 1.03 g of a polymer was obtained.

Catalytic activity per gram of nickel atom was 7.02 kg-polymer/g-nickel.

The weight average molecular weight of the polynorbornene as determined by GPC was 2,660,000, and the number average molecular weight was 1,050,000. The reduced viscosity, $\eta$ sp/c, measured at 135° C. in 1,2,4-trichlorobenzene (concentration 0.1 g/dl) was 3.82 dl/g.

The $^1$H-NMR spectrum and IR absorption spectrum of the polynorbornene were in good agreement with those of the polymer of Example 1.

EXAMPLE 19

In the same manner as in Example 1 (2) except that 50 mmol of 1,4,5,8-dimethano-1,2,3,4,4a,5,8,8a-octahydronaphthalene was used in place of 2-norbornene, 2.53 g of a polymer was obtained.

Catalytic activity per gram of nickel atom was 17.2 kg-Polymer/g-nickel.

The weight average molecular weight of the poly(1,4,5,8-dimethano-1,2,3,4,4a,5,8,8a-octahydronaphthalene) as determined by GPC was 1,960,000, and the number average molecular weight was 623,000. The reduced viscosity, $\eta$ sp/c, measured at 135° C. in 1,2,4-trichlorobenzene (concentration 0.1 g/dl) as 2.78 dl/g.

EXAMPLE 20

In the same manner as in Example 1 (2) except that 50 mmol of 5-ethylidene-2-norbornene was used in place of 2-norbornene, and 2.5 micromoles of dichloro(1,5-cyclooctadiene)palladium was used in place of nickel bisacetylacetonate 0.25 g of a polymer was obtained.

Catalytic activity per gram of palladium atom was 0.94 kg-polymer/g-palladium.

The weight average molecular weight of the poly(5-ethylidene-2-norbornene) as determined by GPC was 563,000, and the number average molecular weight was 226,000.

REFERENCE EXAMPLE 1

In a 50-milliliter flask, 10 ml of a toluene solution (5 mol/l) of norbornene was placed in an argon atmosphere, and 1.0 mmol as aluminum atom of the methylaluminoxane obtained in Example 1 (1) and 0.005 mmol of cyclopentadienyltitanium trichloride were placed. Polymerization was conducted at 50° C. for 4 hours. Then 10 ml of methanol was added to terminate the reaction.

The product thus obtained was subjected to de-ashing treatment using a mixed solution of hydrochloric acid and methanol, washed with methanol, and dried under reduced pressure at room temperature to obtain a white, powdery polymer in an yield of 6.4%.

Catalytic activity per gram of transition metal was 1,250 g-polymer/g-transition metal. The polymer obtained was soluble in solvents such as toluene and chloroform. The weight average molecular weight of the polymer as determined by GPC was 6,000. A $^1$H-NMR spectrum and IR absorption spectrum of the polymer were in good agreement with those of the polymer of Example 1.

EXAMPLE 21

In a 300-milliliter flask, 2.0 g of the polymer obtained in Example 1 (2) and 98 g of cyclohexane were placed and heated with stirring on an oil bath maintained at 80° C. to prepare a uniform solution.

This solution was flow-extended on a glass plate and allowed to stand at room temperature. After confirming that the solvent was almost evaporated, it was completely dried under reduced pressure by the use of a vacuum drier maintained at 100° C. to obtain a film.

For this film, the thickness was 100 $\mu$m, the total light transmittance was 93.7%, and the haze was 4.8%. Temperature dependency of kinematic viscoelasticity and dielectric constant was the same as in Example 1 (3).

EXAMPLE 22

In the same manner as in Example 1 (3) except that decaline was used in place of 1,2,4-trichlorobenzene, a 100 $\mu$m thick film was obtained.

For this film, the total light transmittance was 93.1% and the haze was 7.0%. Temperature dependency of kinematic viscoelasticity and dielectric constant was the same as in Example 1 (3).

EXAMPLE 23

In a 30-milliliter glass container, 9.1 ml of cyclohexane and 0.5 mmol as aluminum atom of methylaluminoxane were placed, and then 2.5 micromoles of nickel bisacetylacetonate was added.

Subsequently, 1.7 ml of a cyclohexane solution containing 70% by weight of 2-norbornene (2-norbornene 10 mmol) was added, and polymerization was conducted at 50° C. for one hour.

Then a diluted aqueous solution of hydrochloric acid was added to decompose the catalyst component. After separation of the aqueous layer, an organic layer was dried over anhydrous sodium sulfate.

This solution was flow-extended on a glass plate and allowed to stand at room temperature. After confirming that the solvent was evaporated, it was completely dried under reduced pressure by the use of a vacuum drier maintained at 150° C. to obtain a film.

For this film, the thickness was 100 μm, the total light transmittance was 90.2%, and the haze was 7.0%. Temperature dependency of kinematic viscoelasticity and dielectric constant was the same as in Example 1 (3).

EXAMPLE 24

In the same manner as in Example 23 except that decaline was used in place of cyclohexane, 2-norbornene was polymerized to obtain a solution of polynorbornene.

This solution was flow-extended on a glass plate and the solvent was evaporated under reduced pressure by the use of a vacuum drier maintained at 100° C. After confirming that the solvent was almost evaporated, the temperature was raised to 200° C. to completely dry the film.

For this film, the thickness was 100 μm, the total light transmittance was 92.6%, and the haze was 6.3%. Temperature dependency of kinematic viscoelasticity and dielectric constant was the same as in Example 1 (3).

What is claimed is:

1. A process for producing a norbornene polymer consisting essentially of a repeating unit of formula (I):

(I)

wherein $R^1$ to $R^{12}$ are the same or different and are independently a hydrogen atom, a hydrocarbon group having 1 to 20 carbon atoms, or a substituent containing a halogen atom, an oxygen atom or a nitrogen atom; $R^5$ and $R^7$ may combine together to form a ring; and n is an integer of 0 or more, and having a weight average molecular weight of $1 \times 10^5$ to $1 \times 10^7$ as determined by gel permeation chromatography, which process comprises polymerizing a norbornene monomer of the formula (II):

(II)

wherein $R^1$ to $R^{12}$ are the same or different and are independently a hydrogen atom, a hydrocarbon group having 1 to 20 carbon atoms, or a substituent containing a halogen atom, an oxygen atom or a nitrogen atom; $R^5$ and $R^7$ may combine together to form a ring; and n is an integer of 0 or more, in the presence of a catalyst comprising a transition metal compound component containing a transition metal selected from the group consisting of manganese, nickel and palladium, and an aluminoxane component.

2. The process as claimed in claim 1, wherein the aluminoxane component is a compound obtained by contacting an organoaluminum compound and water.

3. The process as claimed in claim 2, wherein the organoaluminum compound is a compound of the formula $AlR_3^{17}$, wherein $R^{17}$ is at least one alkyl group having 1 to 8 carbon atoms.

4. The process as claimed in claim 3, wherein the organoaluminum compound is trimethylaluminum, triethylaluminum or triisobutylaluminum.

5. The process as claimed in claim 1, wherein the molar ratio of aluminum in the aluminoxane component to the transition metal in the transition metal compound component is 1 to $10^1$.

6. The process as claimed in claim 1, wherein the catalyst further comprises an organoaluminum compound.

7. The process as claimed in claim 1, wherein the transition metal is nickel.

8. The process as claimed in claim 1, wherein $R^1$ to $R^{12}$ are the same or different and are a hydrogen atom, an unsubstituted alkyl group having 1 to 20 carbon atoms; an aryl or an alkylaryl group having 6 to 20 carbon atoms; an alkylidene group having 1 to 20 carbon atoms; an alkenyl group having 2 to 20 carbon atoms; a halogen atom selected from the group consisting of fluorine, chlorine, bromine and iodine; and an alkyl group having 1 to 20 carbon atoms and being substituted with a halogen atom selected from the group consisting of fluorine, chlorine, bromine and iodine; an alkoxy group having 1 to 20 carbon atoms; a cyano group; an alkylamino group having 1 to 20 carbon atoms; with the proviso that $R^1$, R2, $R^9$ and $R^{10}$ is not an alkylidene group and when any of $R^3$ to $R^8$ or $R^{12}$ is an alkylidene group, the carbon atom to which the alkylidene group is connected does not have another substituent.

9. The process as claimed in claim 1, wherein $R^1$ to $R^{12}$ are the same or different and are a hydrogen atom, a methyl group, an ethyl group, a n-propyl group, an isopropyl group, a n-butyl group, an isobutyl group, a tert-butyl group, a hexyl group, a phenyl group, a tolyl group, a benzyl group, a methylidene group, an ethylidene, a propylidene group, a vinyl group, an allyl group, a chloromethyl group, a bromomethyl group, a chloroethyl group, a methoxy group, an ethoxy group, a propoxy group, a phenoxy, a methoxycarbonyl group, an ethoxy carbonyl group, a dimethylamino group or a diethylamino group.

10. The process as claimed in claim 1, wherein the polymer is selected from the group consisting of polynorbornene, poly(5-methylnorbornene), poly(5-ethylnorbornene), poly(5-propylnorbornene), poly(5,6-dimethylnorbornene), poly(1-methylnorbornene), poly(7-methylnorbornene), poly(5,5,6-trimethylnorbornene), poly(5-phenylnorbornene), poly(5-benzylnorbornene), poly(5-ethylidenenorbornene), poly(5-vinylnorbornene), poly(1,4,5,8,-dimethano-1,2,3,4,4a,5,8,8a-octahydronaphthalene), poly(2-methyl-1,4,5,8-dimethano-1,2,3,4,4a,5,8,8a-octahydronaphthalene), poly(2-ethyl-1,4,5,8-dimethano-1,2,3,4,4a,5,8,8a-octahydronaphthalene), poly(2,3-dimethyl-1,4,5,8-dimethano-1,2,3,4,4a,5,8,8a-octahydronaphthalene), poly(1,2-dihydrodicyclopentadiene), poly(5-chloronorbornene), poly(5,5-dichloronorbornene), poly(5-fluoronorbornene), poly(5,5,6-trifluoro-6-trifluoromethylnorbornene), poly(5-chloromethylnorbornene), poly(5-methoxynorbornene), poly(5-dimethylaminobornene), and poly5-cyanonorbornene).

11. The process as claimed in claim 4, wherein the transition metal compound component is of the formula wherein M is a transition metal selected from the group consisting of manganese, nickel and palladium, a, b, c and d are integers from 0 to 7, $R^{13}$ to $R^{16}$ are the same or different are hydrogen, fluorine, chlorine, bromine, oxygen, methyl, ethyl, n-propyl, propyl, isopropyl, n-butyl, tert-butyl, isobutyl, octyl, 2-ethylhexyl, methoxy, ethoxy, propoxy, butoxy, phenoxy, phenyl, tolyl, xylyl, benzyl, heptadecylcarbonyloxy, indenyl, fluorenyl, cyclopentadienyl, methylcyclopentadienyl, ethylcyclopentadienyl, 1,2-dimethylcyclopentadienyl, tetramethylcyclopentadienyl, pentamethylcyclopentadienyl, π-allyl, allyl substituted with alkyl, acetylocetonate, acetylocetonate substituted with alkyl, trimethylsilyl, (trimethyl silyl)methyl, nitrogen, ethylene, diethyl ether, tetrahydrofuran, dimethyl ether, ethyl benzoate, acetonitrile, benzonitrite, triethylamine, 2,2′-bipyridene, phenanethroline, triethylphosphine, triphenylphosphine, isocyanide, phosphoric acid, thiocyanate, benzene, toluene, xylene, cycloheptatriene, cyclooctadiene, cyclooctatrine and cyclooctetraene.

12. The process as claimed in claim 4, wherein the transition metal compound component is selected from the group consisting of tricarbonyl(cyclopentadienyl)-manganese, pentacarbonylmethylmanganese, bis(cyclopentadienyl)manganese, manganese bis(acetylacetonate) dicarbonylbis(triphenylphosphine)nickel, dibromobis(triphenylphosphine)nickel, dinitrogenbis[bis(tricyclohexylphosphine)nickel], chlorohydridobis(-tricyclohexylphosphine)nickel, chloro(phenyl)bis(tri-phenylphosphine)nickel, dimethylbis(trimethylphosphine)nickel, diethyl(2,2′-bipyridyl)nickel, bis(allyl)-nickel, bis(cyclopentadienyl)nickel, bis(methylcyclopentadienyl)nickel, bis(pentamethylcyclopentadienyl)nickel, allyl(cyclopentadienyl)nickel, (cyclopentadienyl)(cyclooctadiene)nickel tetrafluoroborate, bis(cyclooctadiene)nickel, nickel bisacetylacetonate, allylnickel chloride, tetrakis(triphenylphosphine)-nickel, nickel chloride, $(C_6H_5)Ni\{OC(C_6H_5)CH=P(C_6H_5)_2\}$ $\{P(C_6H_5)_3\}$ and $(C_6H_5)Ni\{OC(C_6H_5)C(SO_3Na)=P(C_6H_5)_2\}$ $\{P(C_6H_5)_3\}$ dichlorobis(benzonitrile)palladium, carbonyltris(triphenylphosphine)palladium, dichlorobis(-triethylphosphine)palladium, bis(tert-butyl-iso-cyanide) palladium, palladium bis(acetylacetonate), dichloro(tet-raphenylcyclobutadiene)palladium, dichloro(1,5-cyclooctadiene)palladium, allyl(cyclopentadienyl)palladium, bis(allyl)palladium, allyl(1,5-cyclooctadiene)-palladium tetrafluoroborate, (acetylacetonate) (1,5-cyclooctadiene)palladium tetrafluoroborate and tetrakis (acetonitrile)palladium bis(tetrafluoroborate).

13. The process as claimed in claim 12, wherein the molar ratio of aluminum in the aluminoxane component to the transition metal is 10 to $10^4$; and the process is carried out at a temperature of $-10°$ C. to $+120°$ C.

14. The process as claimed in claim 1, which further comprises forming a solution of said norbornene polymer and an organic solvent and evaporating the organic solvent to form a film.

15. The process as claimed in claim 14, wherein the organic solvent is at least one solvent selected from the group consisting of aromatic hydrocarbons, alicyclic hydrocarbons and halogenated hydrocarbons.

16. The process as claimed in claim 15, wherein the concentration of the norbornene polymer in the solution is 0.1 to 20% by weight.

17. The process as claimed in claim 15, wherein the norbornene polymer is poly(1,4,5,8-dimethano-1,2,3,4,4a,5,8,8-octahydronaphthalene).

18. The process as claimed in claim 15, wherein the norbornene polymer is poly(5-ethylidene-2-norbornene).

19. The process as claimed in claim 1, wherein the transition metal is palladium.

20. The process as claimed in claim 1, wherein the transition metal is manganese.

21. The process as claimed in claim 4, wherein the transition metal component is selected from the group consisting of
nickel bisacetylacetonate,
biscyclooctadienylnickel,
biscyclopentadienylnickel,
tetrakis (triphenylphosphine)nickel,
chloro(phenyl)bis(triphenylphosphine)nickel,
$(C_6H_5)Ni\{OC(C_6H_5)_2CH=P(C_6H_5)_2\}$ $\{P(C_6H_5)_3$,
nickel chloride,
dichloro(1,5-cyclooctadiene)palladium,
dichlorobis(benzonitrile)palladium,
tetrakis(triphenylphosphine)palladium,
palladium bis(acetylacetonate),
palladium chloride and
manganese bis(acetylacetonate).

* * * * *

UNITED STATES PATENT AND TRADEMARK OFFICE
CERTIFICATE OF CORRECTION

PATENT NO. : 5,344,900

DATED : September 6, 1994

INVENTOR(S) : MAEZAWA et al

Page 1 of 2

It is certified that error appears in the above-identified patent and that said Letters Patent is hereby corrected as shown below:

On page 2 of the Title Page (which contains the end portion of the ABSTRACT), column 2, column 5 and column 18, replace the structural formula (II) with the following structural formula (II)

--  --.

UNITED STATES PATENT AND TRADEMARK OFFICE
CERTIFICATE OF CORRECTION

PATENT NO. : 5,344,900

DATED : September 6, 1994

INVENTOR(S) : MAEZAWA et al

It is certified that error appears in the above-identified patent and that said Letters Patent is hereby corrected as shown below:

Column 18, line 34 (Claim 3): delete "$AlR_3^{17}$" and insert --$AlR^{17}_3$--.

Column 18, line 42 (Claim 5): delete "$10^1$" and insert --$10^6$--.

Column 19, line 32 (Claim 11): delete the entire formula and insert --$MR^{13}_a R^{14}_b R^{15}_c R^{16}_d$--.

Column 20, line 40 (Claim 17): delete the entire line and insert --1,2,3,4,4a,5,8,8a-octahydronaphthalene).--

Signed and Sealed this

Fourteenth Day of March, 1995

Attest:

BRUCE LEHMAN

Attesting Officer

Commissioner of Patents and Trademarks